United States Patent
Simionescu et al.

(10) Patent No.: US 12,443,370 B2
(45) Date of Patent: Oct. 14, 2025

(54) MEMORY DEVICE ACTIVE COMMAND TRACKING

(71) Applicant: Micron Technology, Inc., Boise, ID (US)

(72) Inventors: Horia C. Simionescu, Foster City, CA (US); Raja V. S. Halaharivi, Gilroy, CA (US); Prateek Sharma, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 9 days.

(21) Appl. No.: 18/529,437

(22) Filed: Dec. 5, 2023

(65) Prior Publication Data

US 2024/0192891 A1 Jun. 13, 2024

Related U.S. Application Data

(60) Provisional application No. 63/386,551, filed on Dec. 8, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0638* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS

| 8,504,782 | B2 | 8/2013 | Jeddeloh | |
| 9,292,228 | B2* | 3/2016 | Baderdinni | G06F 3/0647 |
| 10,282,103 | B1* | 5/2019 | Stone | G06F 13/24 |
| 10,453,502 | B2* | 10/2019 | Dobelstein | G06F 12/06 |

(Continued)

FOREIGN PATENT DOCUMENTS

WO 2014092967 A1 6/2014

OTHER PUBLICATIONS

International Search Report and Written Opinion for International Application No. PCT/US2023/082695, mailed on Apr. 15, 2024, 9 pages.

*Primary Examiner* — Daniel C. Chappell
(74) *Attorney, Agent, or Firm* — Harrity & Harrity, LLP

(57) ABSTRACT

In some implementations, a memory device may obtain, from a host device, a first one or more commands associated with a first identifier. The memory device may maintain a first counter associated with tracking active commands from the host device. The memory device may detect an event, associated with a command, at a first time. The memory device may switch, based on detecting the event, an active identifier for commands obtained after the first time to a second identifier. The memory device may initiate a second counter associated with tracking active commands that were obtained prior to the first time. The memory device may perform an action associated with a command that is associated with the first identifier. The memory device may update, based on performing the action, the first counter and the second counter based on the at least one command being associated with the first identifier.

25 Claims, 12 Drawing Sheets

(58) Field of Classification Search
CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 10,534,546 | B2* | 1/2020 | Benisty | G06F 3/0679 |
| 11,288,201 | B2* | 3/2022 | Inbar | G06F 3/0679 |
| 2012/0278533 | A1* | 11/2012 | Suzuki | G11C 16/3404 |
| | | | | 711/E12.008 |
| 2015/0286438 | A1* | 10/2015 | Simionescu | G06F 12/0888 |
| | | | | 711/103 |
| 2015/0347310 | A1* | 12/2015 | Ish | G06F 3/0679 |
| | | | | 711/3 |
| 2016/0026533 | A1* | 1/2016 | Ishikawa | G11C 11/406 |
| | | | | 714/6.2 |
| 2017/0235579 | A1* | 8/2017 | Knauth | G06F 9/30087 |
| | | | | 712/206 |
| 2018/0293002 | A1* | 10/2018 | Bradshaw | G11C 16/349 |
| 2019/0066739 | A1* | 2/2019 | Muchherla | G11C 29/028 |
| 2019/0107958 | A1* | 4/2019 | Bradshaw | G11C 16/349 |
| 2019/0122705 | A1* | 4/2019 | Muchherla | G11C 29/023 |
| 2019/0155540 | A1* | 5/2019 | Yasin | G06F 3/061 |
| 2019/0295666 | A1* | 9/2019 | Parry | G11C 13/0035 |
| 2020/0081653 | A1* | 3/2020 | Tan | G06F 13/1673 |
| 2020/0342934 | A1* | 10/2020 | Lee | G11C 11/4087 |
| 2020/0402569 | A1* | 12/2020 | He | G11C 11/40626 |
| 2021/0124497 | A1* | 4/2021 | Bert | G06F 3/0611 |
| 2022/0197552 | A1 | 6/2022 | Corbetta et al. | |
| 2022/0342784 | A1* | 10/2022 | Xie | G11C 29/832 |

* cited by examiner

MEMORY DEVICE ACTIVE COMMAND TRACKING

CROSS-REFERENCE TO RELATED APPLICATION

This Patent Application claims priority to U.S. Provisional Patent Application No. 63/386,551, filed on Dec. 8, 2022, and entitled "MEMORY DEVICE ACTIVE COMMAND TRACKING." The disclosure of the prior Application is considered part of and is incorporated by reference into this Patent Application.

TECHNICAL FIELD

The present disclosure generally relates to memory devices, memory device operations, and, for example, to memory device active command tracking.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
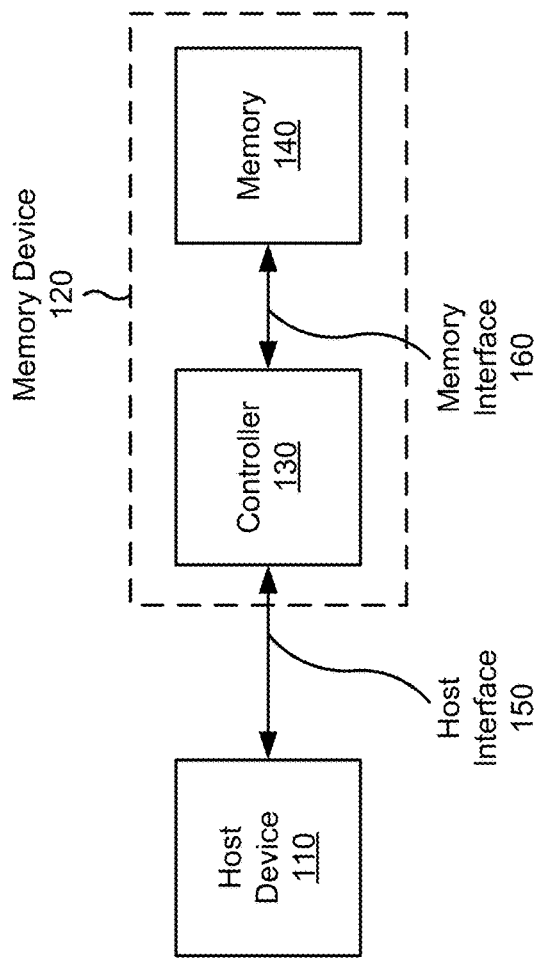
FIG. 1 is a diagram illustrating an example system capable of memory device active command tracking.

Physical memory elements of a memory device can be arranged as logical memory blocks addressed via logical block addressing (LBA). A logical memory block may be the smallest LBA addressable memory unit. Each LBA address identifies a single logical memory block that can be mapped to a particular physical address of a memory unit in the memory device.

The concept of namespace for a memory device may be similar to the concept of partition in a hard disk drive for creating logical storages. Different portions of a memory device can be allocated to different namespaces and thus can have LBA addresses configured independently from each other within their respective namespaces. Each namespace may identify a quantity of memory of the memory device addressable via LBA. The same LBA address can be used in different namespaces to identify different memory units in different portions of the memory device. For example, a first namespace allocated on a first portion of the memory device having n memory units can have LBA addresses ranging from 0 to n−1, and a second namespace allocated on a second portion of the memory device having m memory units can have LBA addresses ranging from 0 to m−1. A host device may send a request to the memory device for the creation, deletion, modification, and/or reservation of a namespace. After a portion of the storage capacity of the memory device is allocated to a namespace, an LBA address in the respective namespace logically represents a particular memory unit in storage media, although the particular memory unit logically represented by the LBA address in the namespace may physically correspond to different memory units at different time instances (e.g., as in solid-state drives (SSDs)).

A conventional memory device may perform various operations with respect to one or more memory components included in the memory device. For example, read operations, program (i.e., write) operations, and erase operations may be performed at one or more memory components. The operations may also be referred to as commands herein. In a conventional memory device, the various operations may be performed in a sequence as each corresponding operation is received. However, in some cases, a first operation or command may impact one or more other operations or commands associated with the memory device. For example, the sequence in which operations are performed by the memory device may not be an order in which the commands are received by the memory device. Additionally, or alternatively, a command performed by the memory device may impact another command that has been received, but not yet performed by the memory device.

For example, namespace parameters may be stored, managed, and/or tracked by the memory device using a single, or common, table. Namespace parameters may include a size of the namespace, privileges of the namespace, an identifier of the namespace, and/or a mapping of the namespace (e.g., to an LBA address or a memory unit), among other examples. The memory device may receive a command indicating an operation associated with a namespace (e.g., a creation, deletion, modification, and/or reservation of the namespace). However, the memory device may have already received commands associated with the namespace (e.g., before receiving the command indicating the operation associated with the namespace) and/or may receive additional commands associated with the namespace (e.g., before performing the operation associated with the namespace). Because the operation may change the namespace parameters and/or may delete the namespace entirely, performing the operation associated with the namespace may impact other operations associated with the namespace that are pending at the memory device. However, the memory device may track the sequence in which the operations are to be performed (e.g., which may not be an order in which the commands are received by the memory device) without differentiating between commands which may affect one another. For example, the memory device may perform a deletion of the namespace. The memory device may attempt to perform another operation associated with the namespace (e.g., that was transmitted by a host device and/or received by the memory device prior to the command indicating that the namespace is to be deleted). However, because the namespace has been deleted, the memory device may be unable to perform the other operation. This may negatively impact the performance of the memory device.

As another example, the memory device may be associated with multiple physical functions (PFs). A PF may be associated with a physical connection and/or a physical port associated with a host device. For example, a memory device may include multiple PFs and each PF may be advertised to a host device as a separate device (e.g., even though the PFs are associated with the same memory device). For example, a command to the memory device may be directed to a given PF of the memory device. However, an operation performed on the given PF may impact operations associated with one or more other PFs of the memory device. For example, a reset of the given PF may impact the performance of other PFs of the memory device. As another example, the memory device may maintain a single table for namespace management (e.g., that is referenced by all PFs associated with the memory device). In such examples, if an operation associated with a first PF modifies information and/or a structure of the table, and another operation associated with a second PF is associated with a command that references previous information and/or a structure of the table, the memory device may misinterpret the command for the second PF and/or may be unable to perform the command for the second PF. In some cases, this problem may be mitigated by pausing or stopping operations on other PFs when an operation on a given PF will impact the other PFs. However, pausing or stopping the operations on the other PFs may negatively impact the performance of the memory device and/or may introduce latency.

Some implementations described herein enable memory device active command tracking. For example, the memory device may obtain a first one or more commands. The memory device may store information associated with the first one or more commands using a first identifier and a first counter that is associated with tracking active commands from a host device. The memory device may detect an event. The event may be associated with an operation or command that impacts other operations or commands and/or other PFs of the memory device. For example, the event may be associated with the host device, the memory device, and/or a command, among other examples. The memory device may initiate, based on detecting the event, a second counter associated with the first identifier and one or more active commands associated with the first identifier as indicated by the first counter at a time prior to detecting the event (e.g., at the time at which the event is detected). The memory device may obtain a second one or more commands after detecting the event. The memory device may store information associated with the second one or more commands using a second identifier and the first counter.

In other words, based on detecting the event, the memory device may switch (e.g., in response to detecting the event) an active command identifier, for commands obtained from a host device, from the first identifier to the second identifier. Additionally, the memory device may initiate a second counter that is associated with the event. The second counter may be associated with tracking commands that were active at a time at which the event is detected. For example, the switch to the second identifier and/or the initiation of the second counter may be a time domain flag that can be used by the memory device to track and/or differentiate commands that are received before the event and after the event. The second counter may provide a "snapshot" of the active commands at the time at which the event is detected. In some implementations, the memory device may perform a command associated with the event based on the second counter indicating that there are no active commands remaining.

As a result, the memory device may be enabled to track and/or differentiate commands that are received before an event and after the event that may impact other commands and/or other PFs of the memory device. Therefore, the memory device may be enabled to ensure that commands that were received before detecting the event are performed prior to performing a command (e.g., associated with the event) that may impact the commands that were received before detecting the event. Additionally, the memory device may be enabled to reject or not perform commands that were received after detecting the event (e.g., in cases where the commands should have otherwise not been sent, such as when the event is associated with a deletion of a namespace and a command references a deleted namespace). This improves a performance of the memory device because the memory device may perform commands that may be impacted by another command before the other command is performed. As a result, active commands at a time at which an event is detected may be performed by the memory device before a command or operation associated with the event is performed.

FIG. 1 is a diagram illustrating an example system 100 capable of memory device active command tracking. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to obtain, from a host device, a first one or more commands; store information associated with the first one or more commands using a first identifier and a first counter that is associated with tracking active commands from the host device; detect an event associated with at least one of the host device, the memory device, or a command; initiate, based on detecting the event, a second counter associated with the first identifier and one or more active commands associated with the first identifier as indicated by the first counter at a time prior to detecting the event; obtain, from the host device, a second one or more commands after detecting the event; and store information associated with the second one or more commands using a second identifier and the first counter.

In some implementations, the memory device 120 and/or the controller 130 may be configured to obtain, from a host device, a first one or more commands, the first one or more commands being associated with a first identifier; maintain a first counter associated with tracking active commands from the host device; detect an event associated with a command obtained from the host device, the event occurring at a first time; switch, based on detecting the event, an active identifier for commands obtained after the first time from the first identifier to a second identifier; initiate a second counter associated with tracking active commands from the host device that were obtained prior to the first time, the second counter being associated with commands that are associated with the first identifier; perform an action associated with completing at least one command that is associated with the first identifier; and update, based on performing the action, a first value associated with the first counter and a second value associated with the second counter based on the at least one command being associated with the first identifier.

In some implementations, the memory device 120 and/or the controller 130 may be configured to maintain a first counter associated with tracking active commands from a host device, the first counter being associated with a first index value for commands being tracked by the first counter; detect an event associated with a command; switch the first index value to a second index value for the first counter; initiate a second counter based on detecting the event, the second counter being associated with the first index value; and perform the command associated with the event based on the second counter indicating that all commands associated with the second counter have been completed.

As indicated above, FIG. 1 is provided as an example. Other examples may differ from what is described with regard to FIG. 1.

Figure 2:
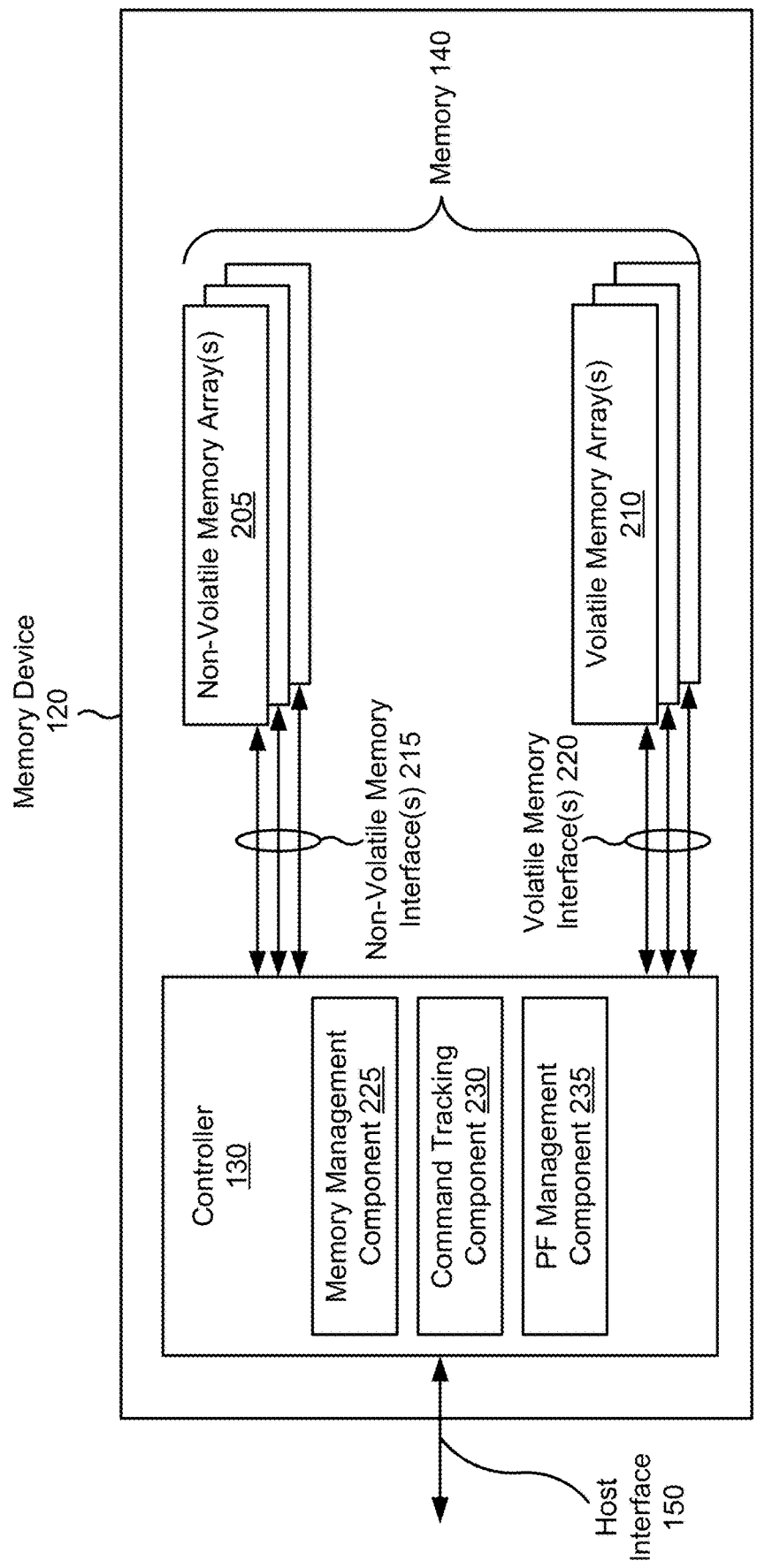
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions.

Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a command tracking component 230, and/or a PF management component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The command tracking component 230 may be configured to track and/or manage active commands associated with the memory device 120. For example, the command tracking component 230 may be configured to maintain one or more counters indicating a quantity of active commands associated with the memory device 120. In some implementations, the command tracking component 230 may be configured to assign an active command identifier to commands that are received or obtained by the memory device. In some implementations, the command tracking component 230 may be configured to switch the active command identifier (e.g., from a first identifier to a second identifier) based on detecting an event, as described in more detail elsewhere herein.

The PF management component 235 may be configured to manage performance of one or more PFs associated with the memory device 120. The PF management component 235 may be configured to perform memory management operations for the one or more PFs. For example, the PF management component 235 may be configured to allocate resources, bandwidth, and/or throughput of the memory device 120 among multiple PFs associated with the memory device 120.

One or more devices or components shown in FIG. 2 may be configured to perform operations described elsewhere herein, such as one or more operations and/or methods described in connection with FIGS. 3, 4A-4E, and 5-8. For example, the controller 130, the memory management component 225, the command tracking component 230, and/or the PF management component 235 may be configured to perform one or more operations and/or methods described herein for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
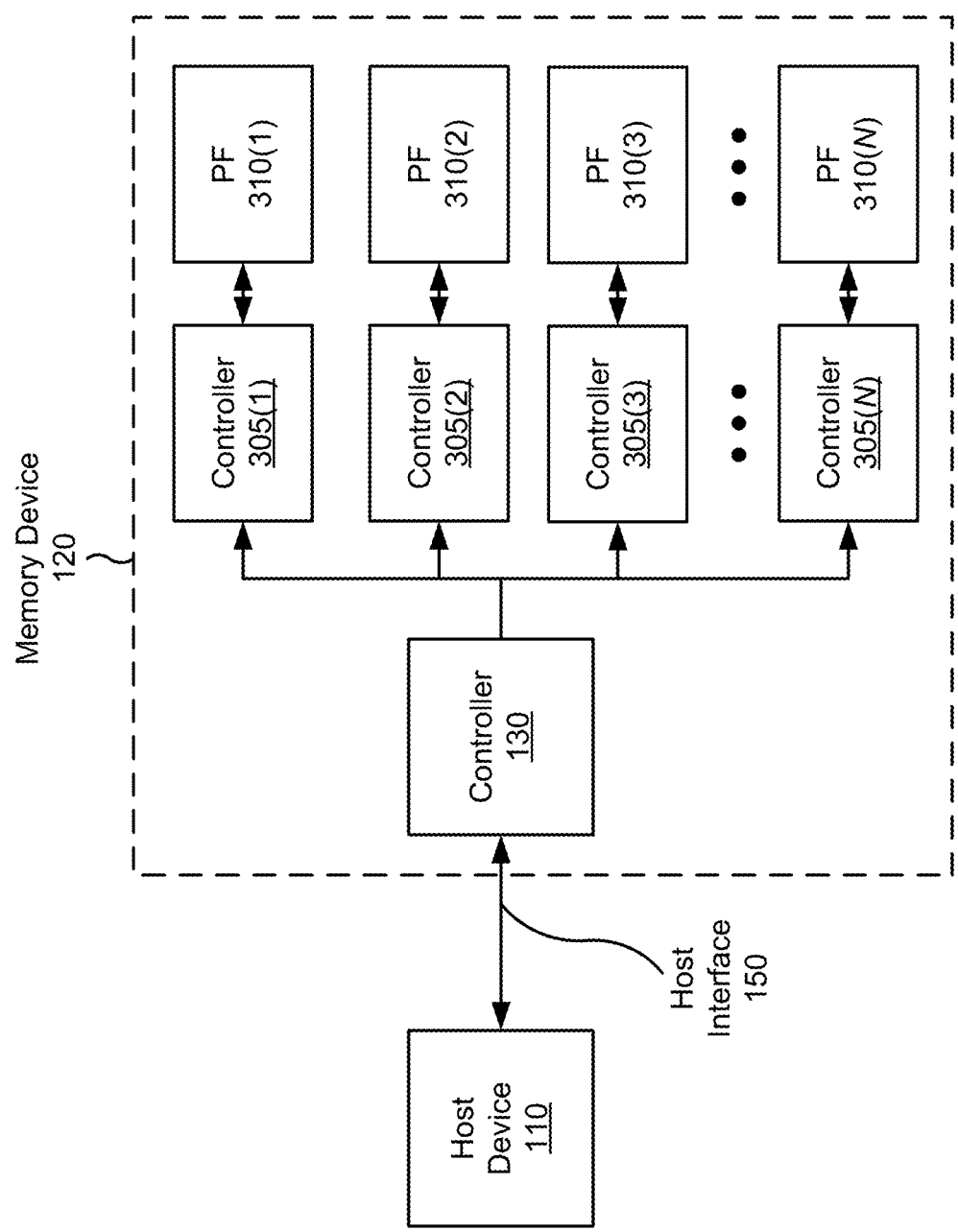
FIG. 3 is a diagram of an example memory device that includes multiple physical functions (PFs).

FIG. 3 is a diagram of an example memory device 120 that includes multiple PFs. As shown in FIG. 3, the memory device may include one or more controllers 305 (e.g., shown as controllers 305(1) through 305(N)). Depending on the implementation, there can be a single controller 305, or multiple virtual controllers 305. A virtual controller 305 may be a virtual entity that appear as a physical controller to other devices, such as the host device 110. FIG. 3 depicts four virtual controllers 305 and four corresponding physical functions 310. In other implementations, however, there can be any other number of controllers 305, each having a corresponding physical function. All of the controllers 305 may have the same priority and same functionality. The controllers 305 may be referred to as NVMe controllers or child controllers, among other examples.

Each of controllers 305 may manage storage access operations for the underlying memory device 120. For example, the controller 305(1) can receive data access requests from the host device 110 over the host interface 150, including requests to read, write, and/or erase data. In response to the request, the controller 305(1) may identify a physical memory address in the memory device 120 pertaining to a logical memory address in the request, perform the requested memory access operation on the data stored at the physical address and return requested data and/or a confirmation or error message to the host device 110, as appropriate. Controllers 305(2) through 305(N) can function in the same or a similar fashion with respect to data access requests for memory device 120.

As described above, each of physical functions 310(1) through 310(N) may be associated with a single controller 305 in order to allow the single controller 305 to appear as a physical controller on the host interface 150. For example, a physical function 310(1) may correspond to the controller 305(1), a physical function 310(2) may correspond to the controller 305(2), a physical function 310(3) may correspond to the controller 305(3), and a physical function 310(N) may correspond to the controller 305(N). Physical functions 310(1) through 310(N) may be fully featured PCIe functions that can be discovered, managed, and manipulated like any other PCIe device, and thus can be used to configure and control a PCIe device. Each physical function 310(1) through 310(N) may have one or more virtual functions associated therewith. The virtual functions may be lightweight PCIe functions that share one or more resources with the physical function and with virtual functions that are associated with that physical function. Each virtual function may have a PCIe memory space, which is used to map its register set. The virtual function device drivers operate on the register set to enable the virtual function functionality and the virtual function appears as an actual PCIe device, accessible by host device 110 over the host interface 150.

Each physical function 310(1) through 310(N) can be assigned to any one of virtual machines in the host device 110. When input/output (I/O) data is received at a controller 305 from a virtual machine, a virtual machine driver provides a guest physical address for a corresponding read/write command. The physical function number can be translated to a bus, device, and function (BDF) number and then added to a direct memory access (DMA) operation to perform the DMA operation on the guest physical address. In one example, the controller 130 further transforms the guest physical address to a system physical address for the memory device 120.

Furthermore, each physical function 310(1) through 310(N) can be implemented in either a privileged mode or normal mode. When implemented in the privileged mode, a physical function has a single point of management that can control resource manipulation and storage provisioning for other functions implemented in the normal mode. In addition, a physical function in the privileged mode can perform management operations, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other implementations, however, any of the physical functions can be configured to operate in the privileged mode. Accordingly, there can be one or more functions that run in the privileged mode.

QoS management can implemented by the controller 130 to access control services for each of the controllers 305. The access control services manage what devices have access permissions for the controllers 305. The access permissions can define, for example, which of virtual machines on host device 110 can access each of the controllers 305, as well as what operations each of the virtual machines can perform on each of the controllers 305. In one example, the controller 130 may control access permissions for each of the controllers 305 individually. For example, in the privileged mode, the controller 130 may grant a virtual machine permission to read and write data using the controller 305(1), but only permission to read data using the controller 305(2). Similarly, in the privileged mode, the controller 130 may grant a virtual machine permission to read and write data using the controller 305(2) only. Any combination of access permissions can be defined for the controllers 305. When a memory access request is received for one of the controllers 305, the controller 130 may analyze the conditions of the request (e.g., requestor, target, operation, and/or requested data address) based on access policies defining the access control services. The access policies can be stored in a local memory of the memory device 120. If the request satisfies the corresponding access policy (the conditions of the request match conditions specified in the corresponding access policy), then the controller 130 may grant the access request. Otherwise, the controller 130 may deny the request.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

FIGS. 4A-4E are diagrams of an example 400 of memory device active command tracking. The operations described in connection with FIGS. 4A-4E may be performed by the memory device 120 and/or one or more components of the memory device 120, such as the controller 130 and/or one or more components of the controller 130.

Figure 4A:
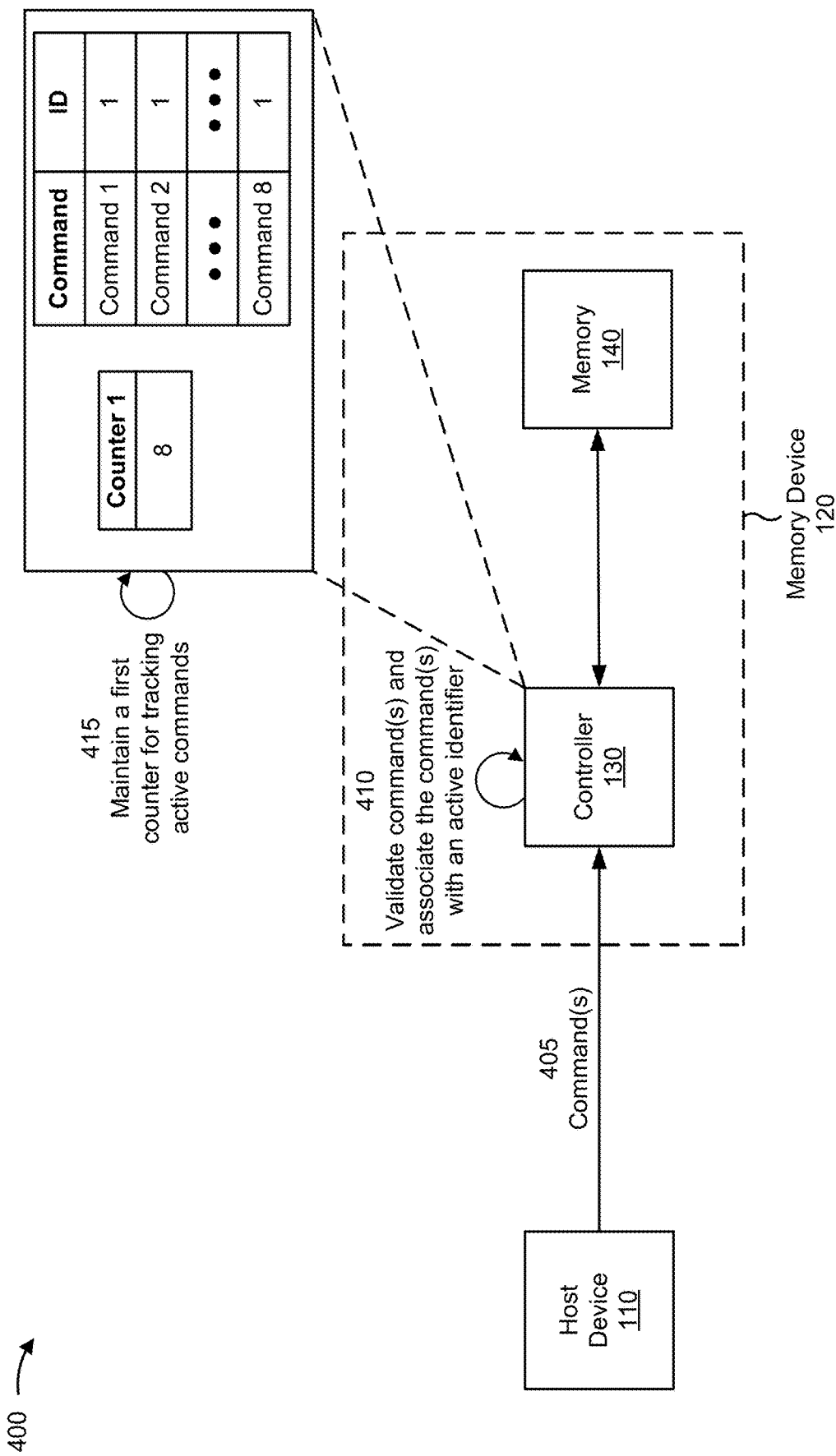
FIGS. 4A-4E are diagrams of an example of memory device active command tracking.

As shown in FIG. 4A, and by reference number 405, the memory device may obtain or receive, from the host device 110, one or more commands. In some implementations, the one or more commands may be associated with a given PF (e.g., from multiple PFs included in the memory device 120). The one or more commands may be associated with a first identifier. The first identifier may be a sequence identifier. For example, the sequence identifier may be associated with identifying an active sequence of commands and/or active command. The identifiers (e.g., sequence identifiers) and/or active command identifiers described herein may also be referred to as index values.

For example, as shown by reference number 410, the controller 130 may validate the one or more commands and may associate one or more commands with the first identifier (e.g., if the command(s) are validated). For example, the memory device 120 may receive an illegal or invalid command. A command may be illegal if, for example, executing the command may cause a violation of one or more of the policy rules or timings. For example, a command may be illegal if a set, row, column, and/or memory cell indicated by the command is currently participating in an operation that is incompatible with the operation requested by the command (e.g., performing the requested operation may violate the timing of the operation currently participating). In one example, an illegal command may direct a read operation to a memory 140 that is not in a state to receive the read command (e.g., the memory 140 may be closed, during the closing, or still during the opening), which may cause the host device 110 to receive erroneous read data. The controller 130 may validate the commands obtained from the host device 110. As part of the command validation, the controller 130 may associate validated commands with an active command identifier (e.g., the sequence identifier and/or the first identifier).

For example, the controller 130 may store an indication of the active command identifier. The active command identifier may be a quantity of bits (e.g., one bit, two bits, four bits, or another quantity of bits) that identifies that the command is currently an active command (e.g., to be performed by the memory device 120.

The memory device 120 may store information associated with the first one or more commands using the first identifier and a first counter that is associated with tracking active commands from the host device 110. For example, as shown by reference number 415, the memory device 120 may maintain a first counter for tracking the active commands. For example, based on receiving and/or validating a command, the memory device 120 may increment the first counter (e.g., to indicate that an additional active command has been received and is to be performed by the memory device 120). For example, the first counter may indicate a quantity of active commands that are in a queue to be performed by the memory device 120. The first counter may be any active command counter associated with the memory device 120. For example, the first counter may be a global read/write command counter associated with the memory device 120 (e.g., associated with tracking all read and/or write commands associated with the memory device 120). As another example, the first counter may be associated with tracking other types of commands.

For example, as shown in FIG. 4A, the memory device 120 may store an indication of active commands to be performed by the memory device 120 (e.g., and/or a given PF). Each command may be associated with the first identifier (e.g., shown as "1" in FIG. 4A). Additionally, the memory device 120 may maintain the first counter (e.g., shown as "Counter 1" in FIG. 4A) indicating a quantity of commands to be performed by the memory device 120.

Figure 4B:
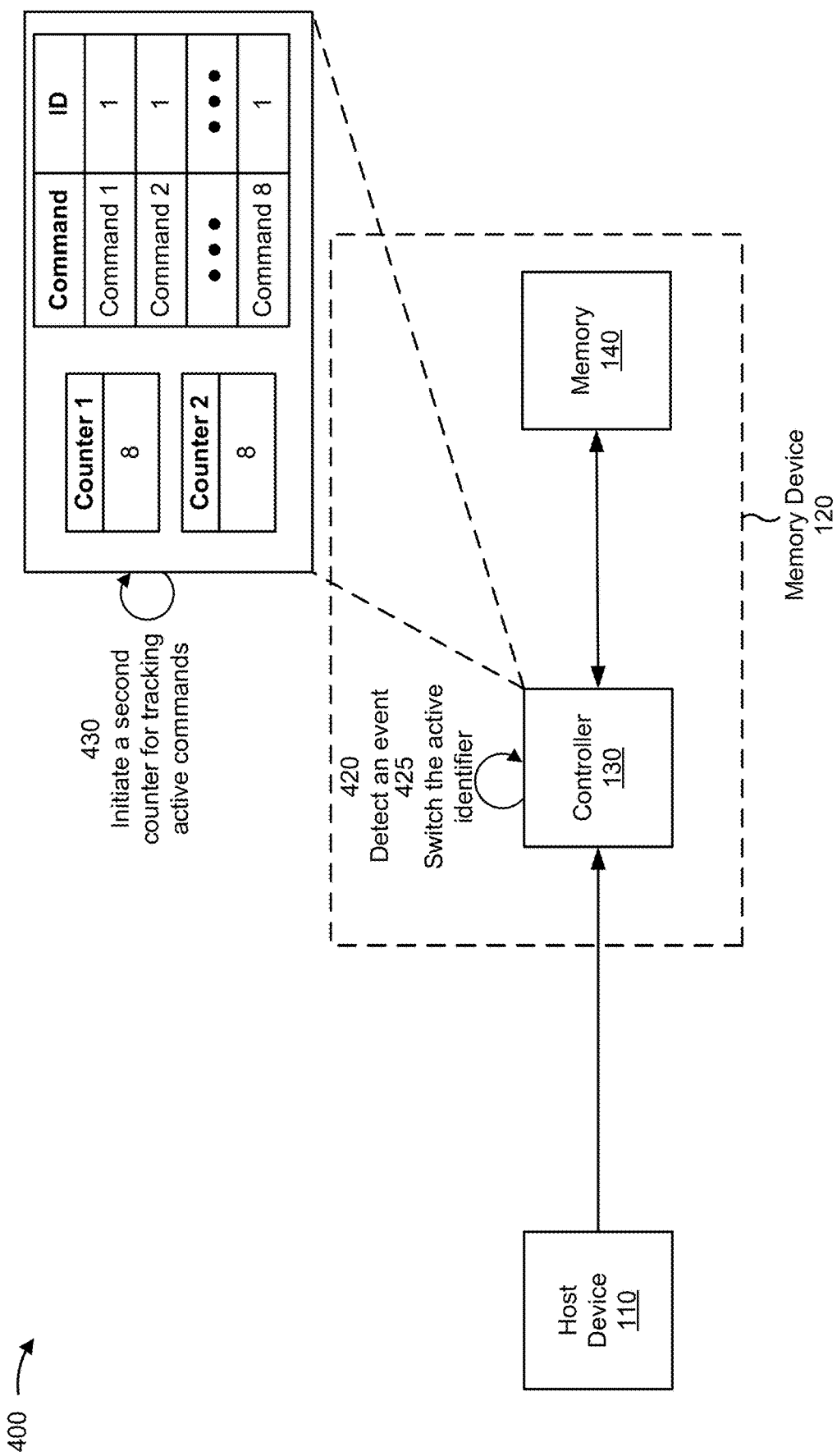

As shown in FIG. 4B, and by reference number 420, the memory device 120 and/or the controller 130 may detect an event. The event may be associated with the host device 110, the memory device 120, and/or a command, among other examples. For example, the event may be associated with a command obtained from the host device 110. For example, the memory device 120 may detect the event based on determining that a command indicating a certain operation has been received. For example, the memory device 120 may detect the event based on receiving a command associated with a namespace (e.g., indicating a creation, deletion, modification, and/or reservation of the namespace). Additionally, the memory device 120 may detect the event based on determining that a command indicating a certain PF has been received. As another example, the memory device 120 may detect the event based on an operational status of the host device 110 and/or a PF of the memory device. For example, the memory device 120 may detect the event based on a PF of the memory device 120 being reset.

For example, the memory device 120 may detect the event based on detecting that a command or operational status (e.g., of the memory device 120, the host device 110, and/or a PF) will impact other commands and/or other PFs of the memory device 120. For example, the command may be associated with a deletion or modification of a namespace. As another example, the command may be associated with a modification of a table that is accessed by multiple PFs of the memory device 120 (e.g., a shared or common table, such as a namespace management table). For example, the memory device 120 may detect the event based on detecting that a shared or common table is to be modified. For example, the memory device 120 may detect the event based on detecting a reset associated with a PF of the memory device 120. As another example, the memory device 120 may detect the event based on detecting a modification of a namespace identifier. As another example, the memory device 120 may detect the event based on detecting a deletion of a namespace identifier. As another example, the memory device 120 may detect the event based on detecting an addition of a namespace identifier. As another example, the memory device 120 may detect the event based on detecting a modification to a table or database associated with storing namespace identifiers.

As shown by reference number 425, the memory device 120 and/or the controller 130 may switch the active identifier (e.g., the active command identifier) for commands received from the host device. For example, the memory device 120 and/or the controller 130 may switch, in response to detecting the event, an active command identifier, for commands obtained from the host device, from the first identifier to a second identifier (e.g., a second sequence identifier). In other words, in response to detecting the event, the memory device 120 and/or the controller 130 may toggle or switch an active command identifier or sequence value for the first counter (e.g., the Counter 1). In other words, based on detecting the event, the memory device 120 and/or the controller 130 may switch an identifier (e.g., a sequence identifier) used to identify commands that are being tracked by the first counter (e.g., the Counter 1).

Additionally, as shown by reference number 430, the memory device and/or the controller 130 may initiate a second counter (e.g., shown as "Counter 2") based on detecting the event. The second counter may be associated with tracking commands that were active prior to the event being detected. In some implementations, the first counter and the second counter may be associated with a single PF. In other examples, the first counter and the second counter may be associated with multiple PFs. In some implementations, the memory device and/or the controller 130 may initiate, for each PF of multiple PFs associated with the memory device 120, the second counter.

The second counter may be referred to as a "snapshot" counter because the second counter may provide a snapshot of the first counter at the time that the event is detected. For example, the event may be detected by the memory device 120 at a first time. At the first time, the first counter may indicate a first value (e.g., 8 as shown in FIG. 4B). The memory device 120 and/or the controller 130 may set a second value of the second counter to the first value of the first counter at the first time. For example, as shown in FIG. 4B, the memory device 120 and/or the controller 130 may initiate the second counter to indicate the same value as the first counter. In other words, the second counter may be associated with tracking active commands at a time at which the event is detected. In some implementations, the memory device 120 and/or the controller 130 may store, for the second counter, a counter value (e.g., 8 as shown in FIG. 4B) and an indication of commands, from the first one or more commands, that are stored in association with the first counter at the time prior to detecting the event (e.g., commands that are associated with the first identifier). The memory device 120 and/or the controller 130 may maintain the second counter based on tracking completed commands that are associated with the first identifier, as described in more detail elsewhere herein.

Figure 4C:
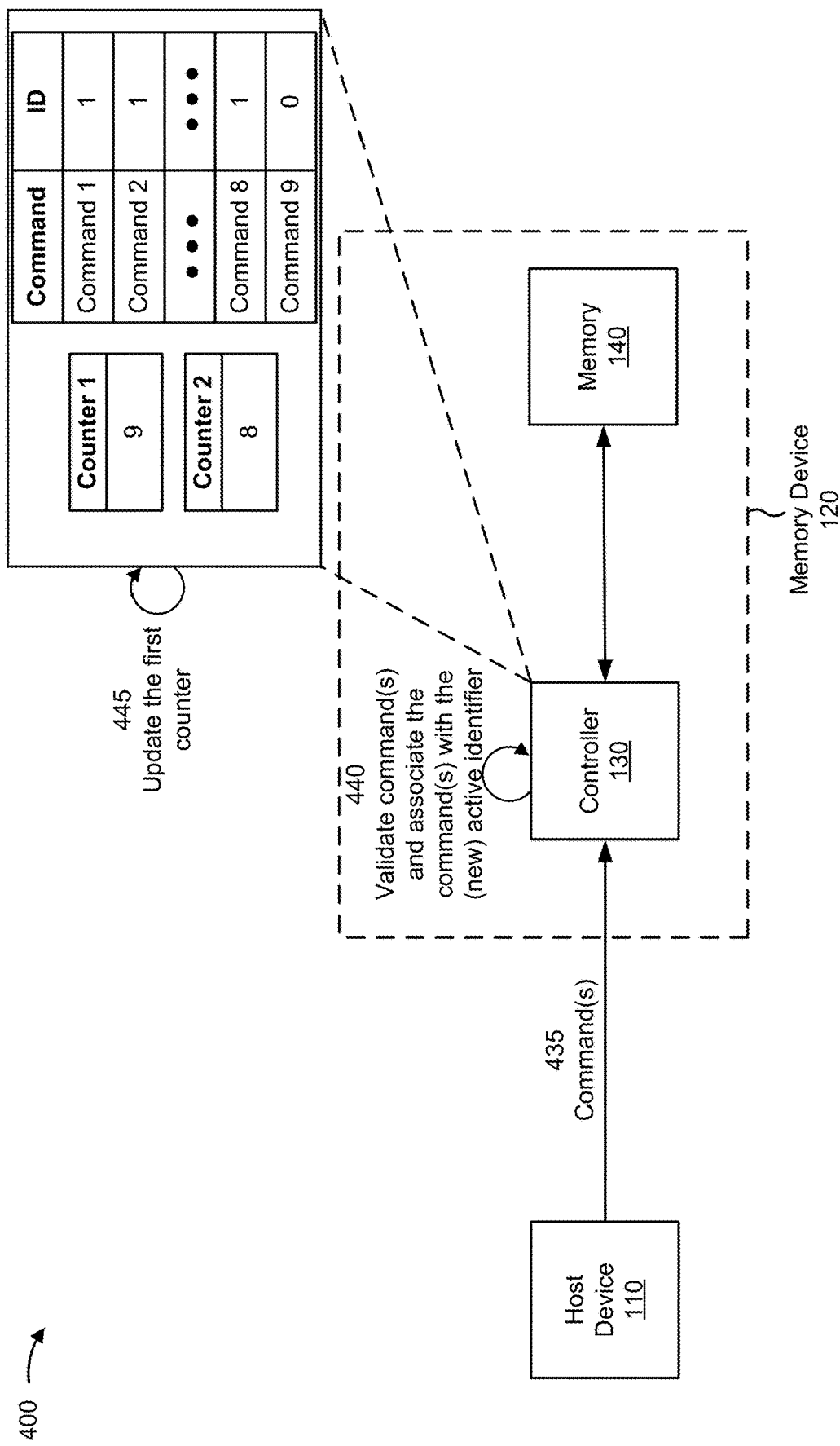

As shown in FIG. 4C, and by reference number 435, the memory device 120 may obtain, from the host device 110, a second one or more commands (e.g., after detecting the event). The one or more commands may be associated with the second identifier. The second identifier may be a sequence identifier. For example, as shown by reference number 440, the controller 130 may validate the second one or more commands and may associate one or more commands with the second identifier (e.g., if the command(s) are validated). As part of the command validation, the controller 130 may associate validated commands with an active command identifier (e.g., the sequence identifier and/or the second identifier).

For example, the controller 130 may store an indication of the active command identifier (e.g., that is switched after detecting the event, as described elsewhere herein). The active command identifier may be a quantity of bits (e.g., one bit, two bits, four bits, or another quantity of bits) that identifies that the command is currently an active command (e.g., to be performed by the memory device 120.

The memory device 120 may store information associated with the second one or more commands using the second identifier and the first counter that is associated with tracking active commands from the host device 110. For example, as shown by reference number 445, the memory device 120 may update the first counter for tracking the active commands. For example, based on receiving and/or validating a command, the memory device 120 may increment the first counter (e.g., to indicate that an additional active command has been received and is to be performed by the memory device 120). For example, the first counter may indicate a quantity of active commands that are in a queue to be performed by the memory device 120. For example, as shown in FIG. 4C, the memory device 120 and/or the controller 130 may increment the first counter (e.g., from a value of 8 to a value of 9) based on obtaining and/or validating a command (e.g., shown as "command 9" in FIG. 4C) after detecting the event. For example, the memory device 120 and/or the controller 130 may increment the first value of the first counter based on the second one or more commands being associated with the second identifier (e.g., that is the active command identifier stored by the controller 130).

The memory device 120 and/or the controller 130 may refrain from incrementing the second value (e.g., associated with the second counter) based on the second one or more commands being associated with the second identifier. For example, the second counter may be associated with the first identifier. When additional commands are obtained by the memory device 120 after detecting the event, the additional commands may be associated with a different identifier than the first identifier (e.g., because the memory device 120 and/or the controller 130 switched the identifier based on detecting the event). Therefore, when new commands are obtained by the memory device 120, the second counter may still only indicate a quantity of active or pending commands that were obtained by the memory device 120 prior to the event occurring.

Figure 4D:
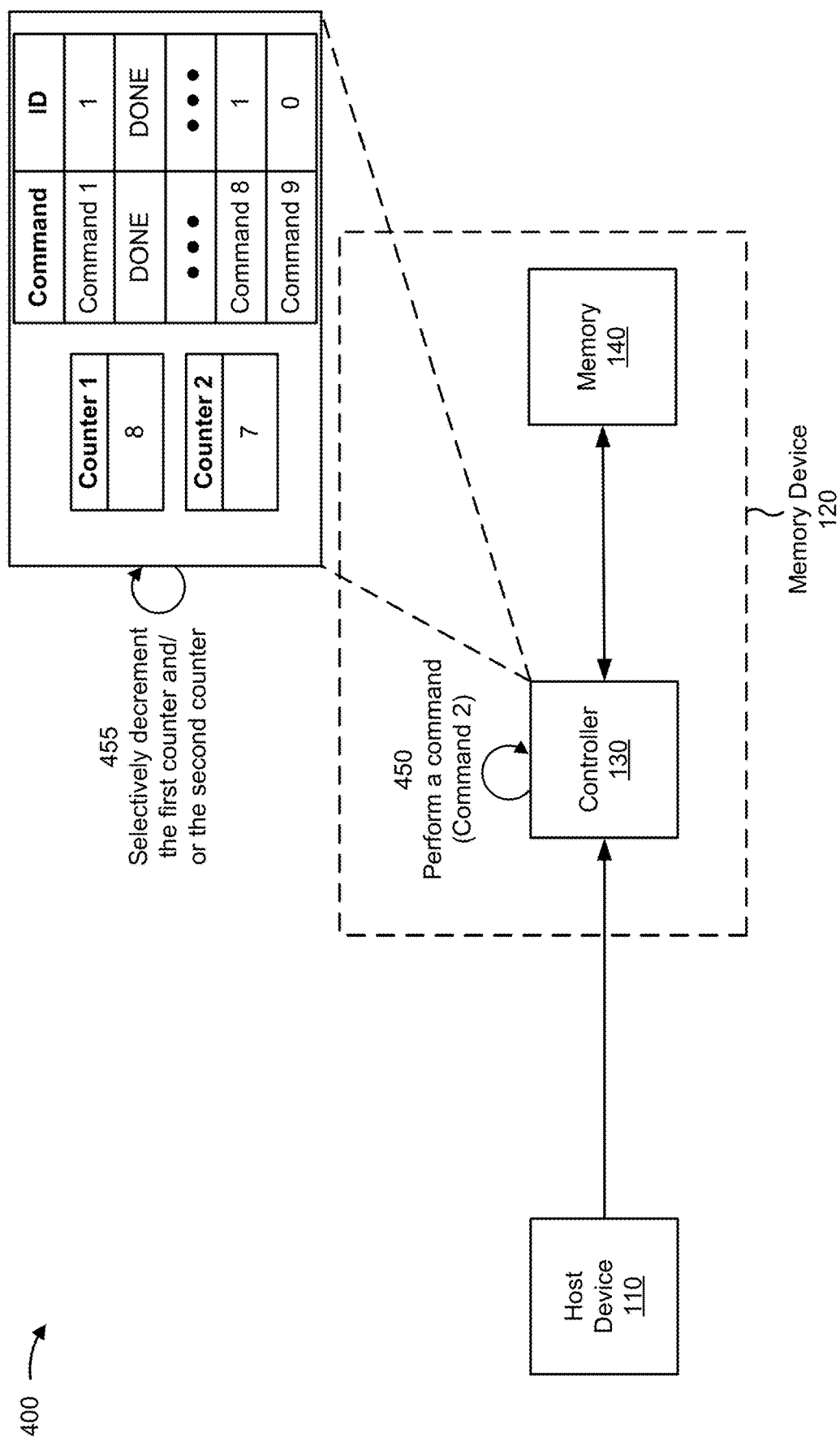

As shown in FIG. 4D, and by reference number 450, the memory device 120 and/or the controller 130 may perform a command. For example, the memory device 120 and/or the controller 130 may perform an action associated with at least one command included in the first one or more commands or the second one or more commands. In some implementations, the action may include performing the command. In some other implementations, the action may include providing an acknowledgement to the host device 110 indicating that the command has been completed. For example, the action may be associated with completing at least one command that is associated with the first identifier (e.g., "1"). Alternatively, the action may be associated with completing at least one command that is associated with the second identifier (e.g., "0").

As shown by reference number 455, the memory device 120 and/or the controller 130 may selectively decrement the first counter and/or the second counter based on performing the action associated with the command. For example, the memory device 120 and/or the controller 130 may decrement the first counter based on performing the action. In other words, the memory device 120 and/or the controller 130 may always decrement the first counter based on completing and/or performing commands. The memory device 120 and/or the controller 130 may always decrement the second counter if the at least one command is associated with the first identifier. In other words, the memory device 120 and/or the controller 130 may only decrement the second counter (e.g., the snapshot counter) if the identifier associated with the command is not a current active command identifier. For example, as described above, the active command identifier may be switched from the first identifier to the second identifier after the event is detected. Therefore, if the command is associated with the first identifier, then the memory device 120 and/or the controller 130 may decrement the second counter. However, if the command is associated with second identifier, then the memory device 120 and/or the controller 130 may refrain from decrementing the second counter.

For example, as shown in FIG. 4D, the command may be the Command 2 that is associated with the first identifier (e.g., "1"). In such examples, the memory device 120 and/or the controller 130 may decrement the first counter (e.g., Counter 1) from a value of 9 to a value of 8 (e.g., based on performing the action associated with the command). Additionally, because the command is associated with the first identifier (e.g., the non-active command identifier), the memory device 120 and/or the controller 130 may decrement the second counter (e.g., Counter 2) from a value of 8 to a value of 7. As another example, if the command is the command 9 (e.g., associated with the second identifier "0"), then the memory device 120 and/or the controller 130 may decrement the first counter (e.g., Counter 1) from a value of 9 to a value of 8 (e.g., based on performing the action associated with the command). Additionally, because the command is associated with the second identifier (e.g., the active command identifier), the memory device 120 and/or the controller 130 may refrain from decrementing the second counter (e.g., Counter 2). In this way, the memory device 120 and/or the controller 130 may track a quantity of active commands that were obtained prior to the event occurring and that have not yet been performed by the memory device 120.

Figure 4E:
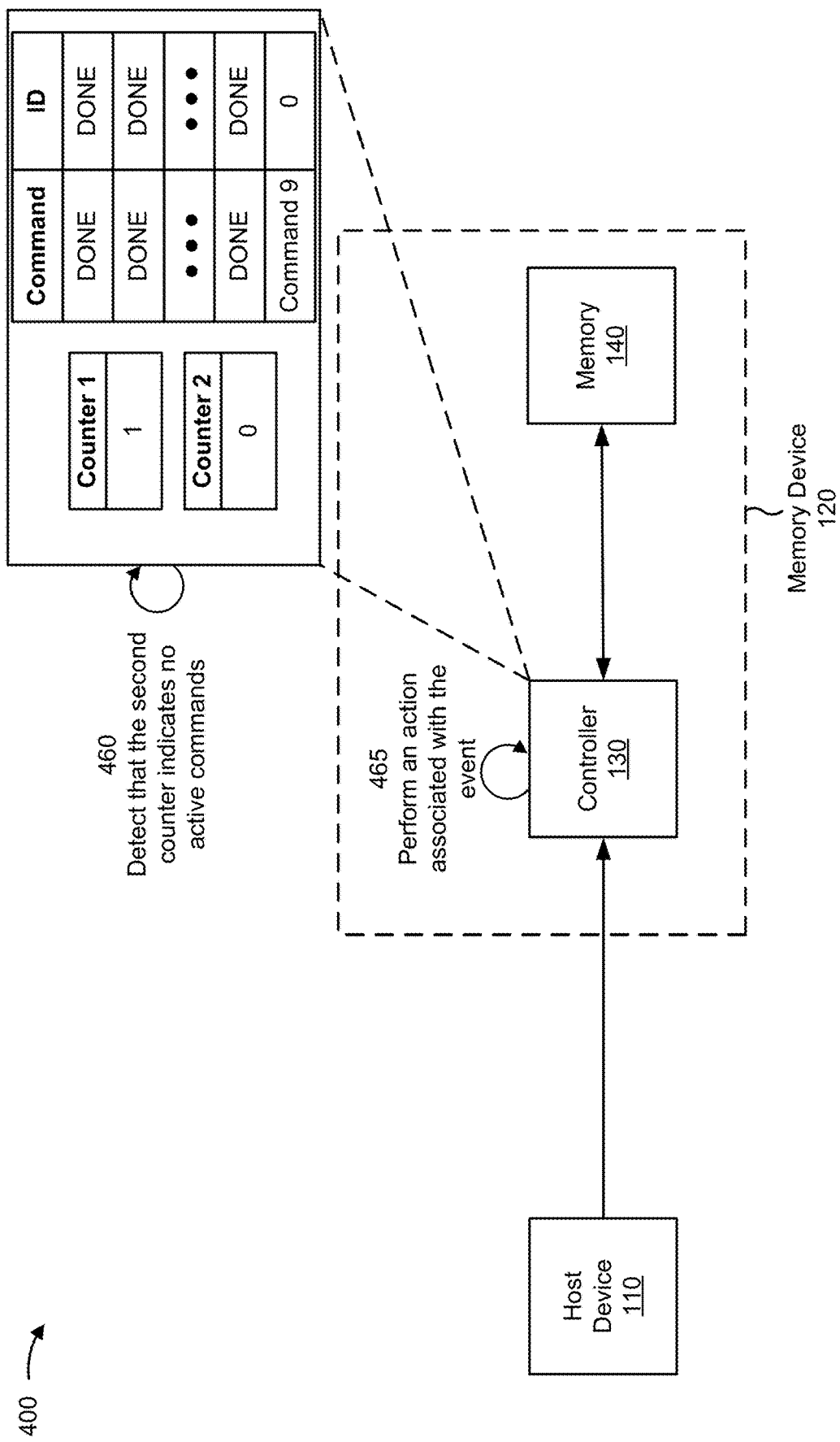

As shown in FIG. 4E, and by reference number 460, the memory device 120 and/or the controller 130 may detect that the second counter indicates that there are no active commands pending. For example, the memory device 120 and/or the controller 130 may detect that a value (e.g., a counter value) of the second counter is zero (0). This may indicate that all commands that were pending at the time that the event occurred and/or was detected have been performed or otherwise completed.

As shown by reference number 465, the memory device 120 and/or the controller 130 may perform an action associated with the event. For example, the memory device 120 and/or the controller 130 may perform the action associated with the event based on detecting that the second counter indicates that there are no active commands pending. For example, the memory device 120 and/or the controller 130 may perform an action associated with a command (e.g., that caused the memory device 120 to detect the event) based on the second counter indicating that there are no active commands associated with the first identifier.

In some implementations, the action may include performing the command and/or completing the command. For example, if the command that caused the memory device 120 to detect the event is associated with a namespace deletion, then the memory device 120 and/or the controller 130 may perform the deletion of the namespace based on the second counter indicating that there are no active commands associated with the first identifier. In some implementations, the action may include refraining from performing commands, included in the second one or more commands, associated with the namespace after performing the action associated with the command. In other words, the memory device 120 and/or the controller 130 may reject commands that arrive after the detection of the event and that are associated with the namespace (e.g., because the namespace has been deleted or otherwise modified after the second counter reaches zero).

In some implementations, the event may be associated with a table that is accessed by the multiple PFs of the memory device 120, as described in more detail elsewhere herein. In such an example, the action may include switching an active table for the multiple PFs from a first table to a second table based on the second counter indicating that there are no active commands associated with the first identifier. For example, the memory device 120 and/or the controller 130 may update the first version of a database or table associated with the multiple PFs based on the command (e.g., the command that caused the memory device 120 to detect the event). The memory device 120 and/or the controller 130 may switch an active version of the database or table from a second version to the first version based on the second counter indicating that all commands associated with the second counter have been completed. In other words, the memory device 120 may maintain two or more versions of the table or database, and the second counter may indicate a timing of a switch of an active table or database (e.g., between the two or more versions). As an example, the database or table may be a namespace database or table.

For example, the memory device 120 and/or the controller 130 may receive a command indicating that a namespace table is to be modified. The memory device 120 and/or the controller 130 may initiate a second counter (e.g., a snapshot counter) for each PF that has access to the namespace table. The memory device may update the namespace table based on the command. After each snapshot counter indicates that no active commands are remaining, the memory device 120 may switch an active namespace table for the PFs to the updated namespace table. In this way, the memory device 120 may ensure that each PF is accessing a correct version of the table (e.g., ensuring that commands received before the event are using the version of the namespace table prior to the event being detected). This may improve the performance of the multiple PFs because operations do not need to be stopped on any PFs to modify a shared or common table.

The memory device 120 may continue to switch active command identifiers and/or initiate snapshot counters in a similar manner as described herein for other detected events. For example, the memory device 120 may detect another event associated with another command obtained from the host device 110, the event occurring at a second time after the time at which the event described above is detected. The memory device 120 may switch, based on detecting the other event, the active identifier for commands obtained after the first time from the second identifier to a third identifier. The memory device may initiate a third counter associated with tracking active commands from the host device 110 that were obtained prior to the second time, the third counter being associated with commands that are associated with the third identifier. In some implementations, the third identifier may be the first identifier (e.g., the memory device may switch between the first identifier and the second identifier). In other examples, the third identifier may be different than the first identifier and the second identifier (e.g., to enable the memory device 120 to differentiate between multiple different time domain splits in the obtained commands).

As indicated above, FIGS. 4A-4E are provided as examples. Other examples may differ from what is described with regard to FIGS. 4A-4E.

Figure 5:
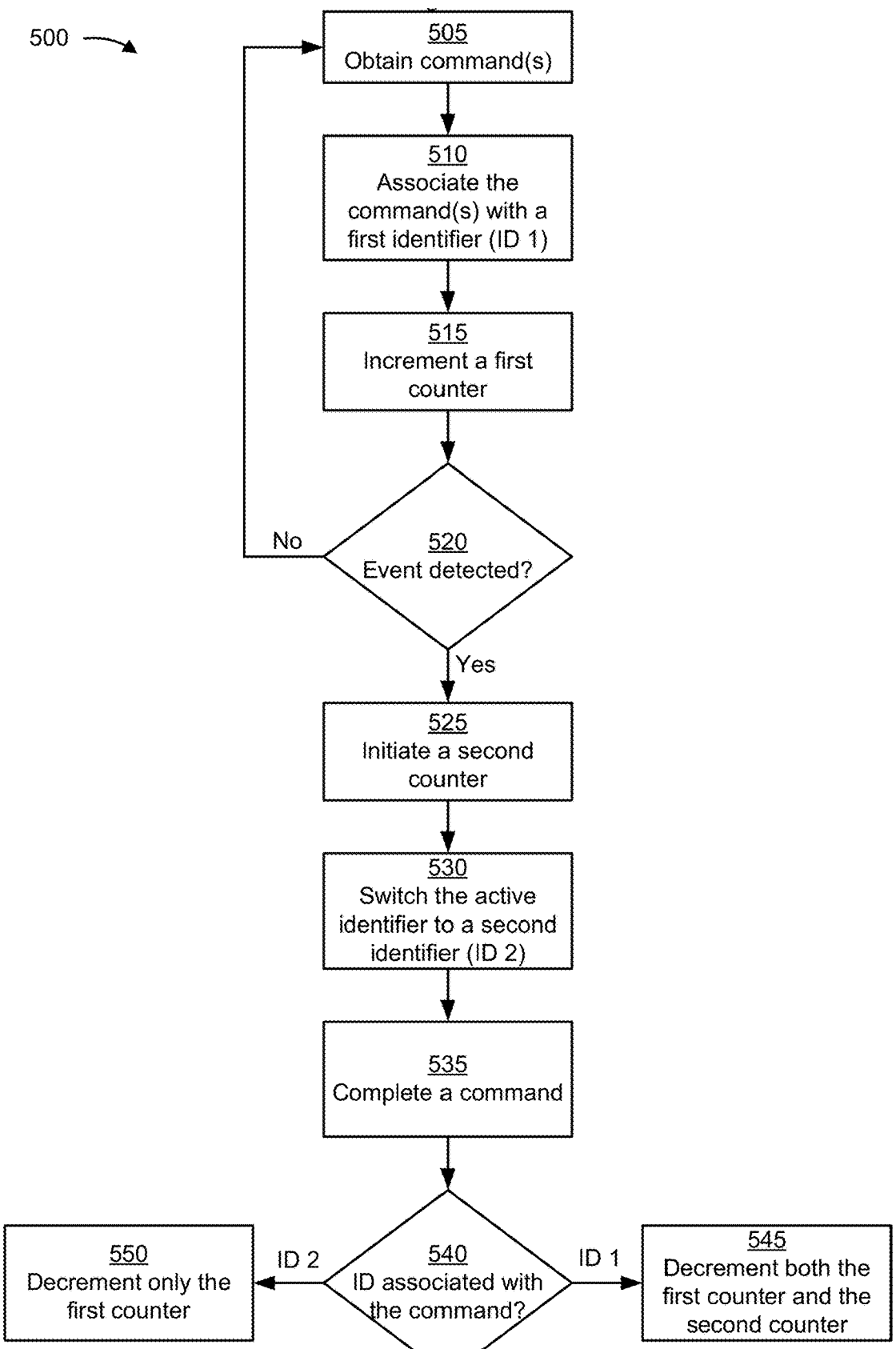
FIG. 5 is a diagram of an example of memory device active command tracking.

FIG. 5 is a diagram of an example 500 of memory device active command tracking. The operations described in connection with FIG. 5 may be performed by the memory device 120 and/or one or more components of the memory device 120, such as the controller 130 and/or one or more components of the controller 130.

As shown in FIG. 5, the memory device 120 may obtain one or more commands (block 505). The memory device 120 may associate the one or more commands with a first identifier (ID 1) (block 510). For example, the first identifier may be a currently active command identifier (e.g., sequence identifier) for the memory device 120. The memory device 120 may increment a first counter (block 515). The first counter may be a command tracking counter, such as a read/write counter that tracks active read commands and/or write commands associated with the memory device 120. If the memory device 120 performs a command, then the memory device may decrement the first counter.

The memory device 120 may determine whether an event has been detected (block 520). For example, the memory device 120 may detect an event in a similar manner as described in more detail elsewhere herein, such as in connection with FIGS. 4A-4E. If an event has not been detected, then the memory device 120 may continue to obtain commands and maintain the first counter in a similar manner as described elsewhere herein.

If an event is detected, then the memory device 120 may initiate a second counter (block 525). For example, the second counter may be a snapshot counter that indicates a quantity of active commands at a time at which the event is detected. For example, a value of the second counter may be set to a value of the first counter at the time at which the event is detected. Additionally, if an event is detected, then the memory device 120 may switch an active identifier (e.g., an active command identifier or an active sequence identifier) from the first identifier to a second identifier (ID 2) (block 530). This may enable the memory device to differentiate between commands that were obtained prior to the event being detected and commands that are obtained after the event is detected.

The memory device 120 may perform and/or complete a command (block 535). The memory device 120 may identify an identifier (e.g., a command identifier or a sequence identifier) that is associated with the command (block 540). If the identifier is the first identifier (ID 1), then the memory device 120 may decrement both the first counter and the second counter (e.g., because the command being associated with the first identifier (e.g., an identifier that is not active) indicates that the command was obtained prior to the detection of the event) (block 545). If the identifier is the second identifier (ID 2), then the memory device 120 may only decrement the first counter (block 550). For example, the memory device may refrain from decrementing the second counter because the command being associated with the second identifier (e.g., an identifier that is active) indicates that the command was obtained after the detection of the event. The memory device 120 may maintain the first counter and the second counter in a similar manner as described elsewhere herein.

As indicated above, FIG. 5 is provided as an example. Other examples may differ from what is described with regard to FIG. 5.

Figure 6:
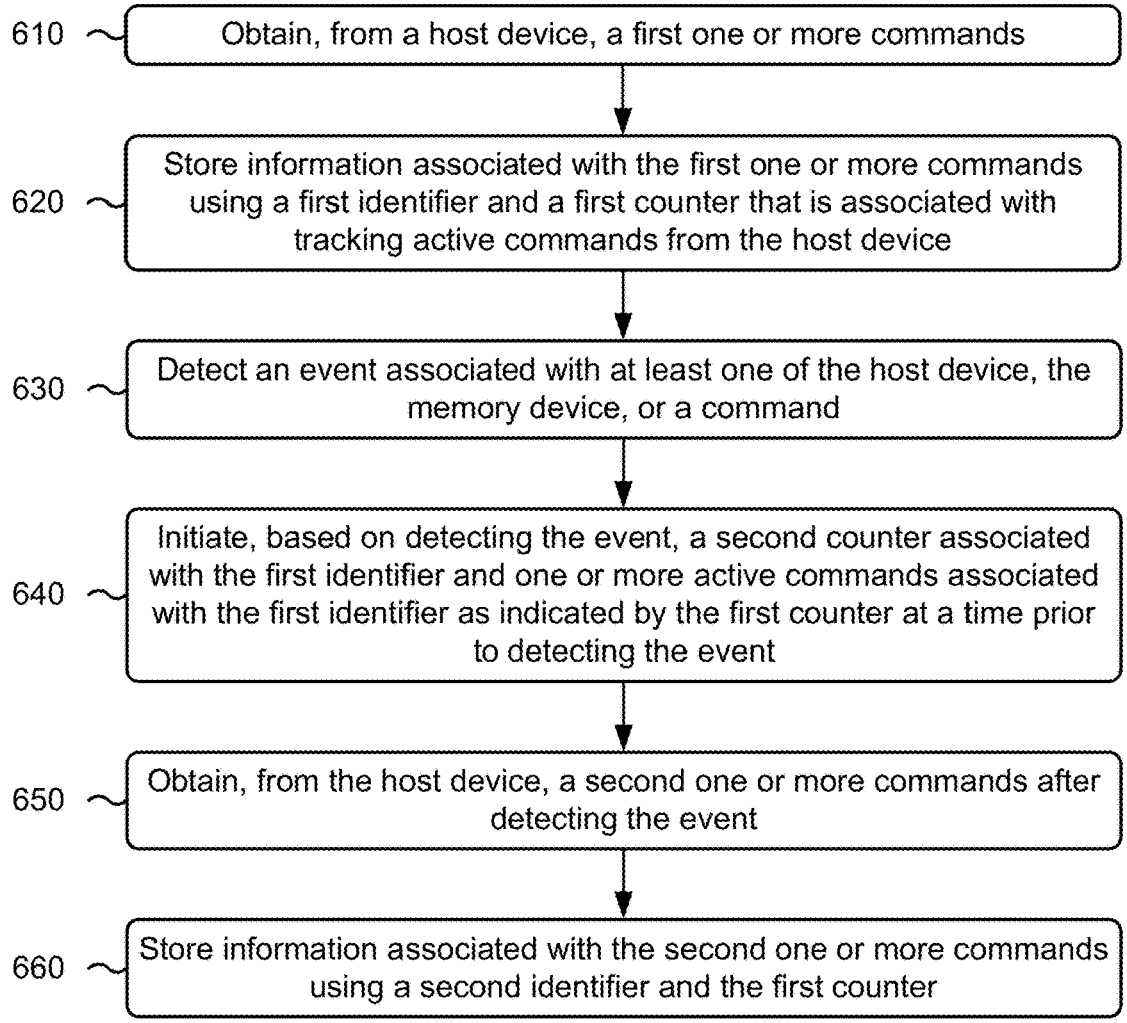
FIG. 6 is a flowchart of an example method associated with memory device active command tracking.

FIG. 6 is a flowchart of an example method 600 associated with memory device active command tracking. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, the command tracking component 230, and/or the PF management component 235) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include obtaining, from a host device, a first one or more commands (block 610). As further shown in FIG. 6, the method 600 may include storing information associated with the first one or more commands using a first identifier and a first counter that is associated with tracking active commands from the host device (block 620). As further shown in FIG. 6, the method 600 may include detecting an event associated with at least one of the host device, the memory device, or a command (block 630). As further shown in FIG. 6, the method 600 may include initiating, based on detecting the event, a second counter associated with the first identifier and one or more active commands associated with the first identifier as indicated by the first counter at a time prior to detecting the event (block 640). As further shown in FIG. 6, the method 600 may include obtaining, from the host device, a second one or more commands after detecting the event (block 650). As further shown in FIG. 6, the method 600 may include storing information associated with the second one or more commands using a second identifier and the first counter (block 660).

The method 600 may include additional aspects, such as any single aspect or any combination of aspects described below and/or described in connection with one or more other methods or operations described elsewhere herein.

In a first aspect, the method 600 includes switching, in response to detecting the event, an active command identifier, for commands obtained from the host device, from the first identifier to the second identifier.

In a second aspect, alone or in combination with the first aspect, the method 600 includes performing an action associated with at least one command included in the first one or more commands or the second one or more commands, decrementing the first counter based on performing the action, and decrementing the second counter if the at least one command is associated with the first identifier.

In a third aspect, alone or in combination with one or more of the first and second aspects, the method 600 includes performing an action associated with the command based on the second counter indicating that there are no active commands associated with the first identifier.

In a fourth aspect, alone or in combination with one or more of the first through third aspects, the method 600 includes refraining from performing commands, included in the second one or more commands, associated with the namespace after performing the action associated with the command.

In a fifth aspect, alone or in combination with one or more of the first through fourth aspects, the method 600 includes storing, for the second counter, a counter value and an indication of commands, from the first one or more commands, that are stored in association with the first counter at the time prior to detecting the event, and maintaining the second counter based on tracking completed commands that are associated with the first identifier.

In a sixth aspect, alone or in combination with one or more of the first through fifth aspects, the memory device is associated with multiple physical functions, and the event is associated with a table that is accessed by the multiple physical functions.

In a seventh aspect, alone or in combination with one or more of the first through sixth aspects, the method 600 includes initiating, for each physical function of the multiple physical functions, the second counter.

In an eighth aspect, alone or in combination with one or more of the first through seventh aspects, the method 600 includes switching an active table for the multiple physical functions from the first table to the second table based on the second counter indicating that there are no active commands associated with the first identifier.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
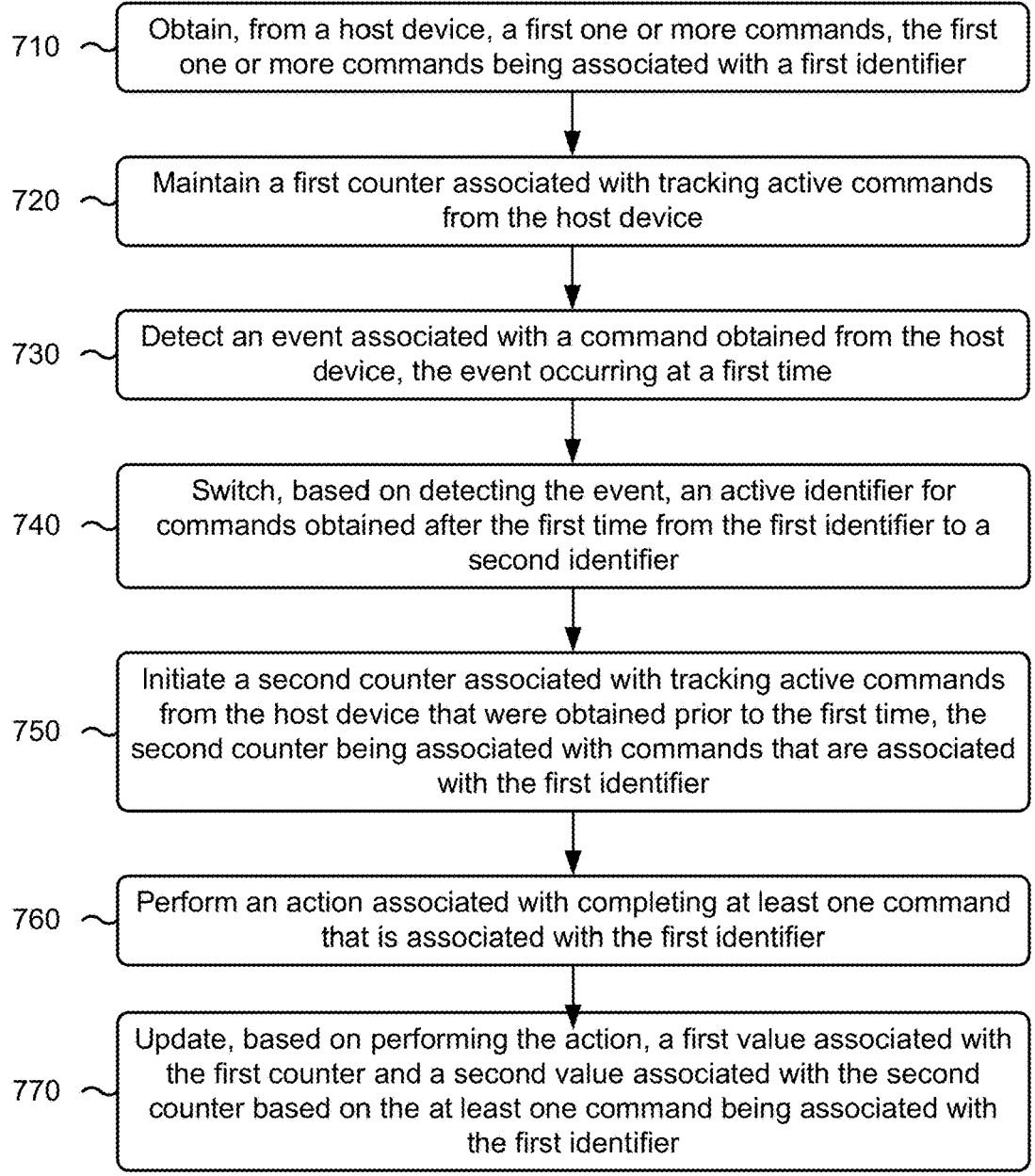
FIG. 7 is a flowchart of an example method associated with memory device active command tracking.

FIG. 7 is a flowchart of an example method 700 associated with memory device active command tracking. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 225, the command tracking component 230, and/or the PF management component 235) may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include obtaining, from a host device, a first one or more commands, the first one or more commands being associated with a first identifier (block 710). As further shown in FIG. 7, the method 700 may include maintaining a first counter associated with tracking active commands from the host device (block 720). As further shown in FIG. 7, the method 700 may include detecting an event associated with a command obtained from the host device, the event occurring at a first time (block 730). As further shown in FIG. 7, the method 700 may include switching, based on detecting the event, an active identifier for commands obtained after the first time from the first identifier to a second identifier (block 740). As further shown in FIG. 7, the method 700 may include initiating a second counter associated with tracking active commands from the host device that were obtained prior to the first time, the second counter being associated with commands that are associated with the first identifier (block 750). As further shown in FIG. 7, the method 700 may include performing an action associated with completing at least one command that is associated with the first identifier (block 760). As further shown in FIG. 7, the method 700 may include updating, based on performing the action, a first value associated with the first counter and a second value associated with the second counter based on the at least one command being associated with the first identifier (block 770).

The method 700 may include additional aspects, such as any single aspect or any combination of aspects described below and/or described in connection with one or more other methods or operations described elsewhere herein.

In a first aspect, the method 700 includes obtaining, from the host device, a second one or more commands, the second one or more commands being associated with the second identifier, incrementing the first value based on the second one or more commands being associated with the second identifier, and refraining from incrementing the second value based on the second one or more commands being associated with the second identifier.

In a second aspect, alone or in combination with the first aspect, the method 700 includes performing another action associated with completing another command that is associated with the second identifier, decrementing the first value based on the other command being associated with the second identifier, and refraining from decrementing the second value based on the other command being associated with the second identifier.

In a third aspect, alone or in combination with one or more of the first and second aspects, the active identifier for commands is a sequence identifier.

In a fourth aspect, alone or in combination with one or more of the first through third aspects, detecting the event comprises detecting at least one of a reset associated with a physical function of the memory device, a modification of a namespace identifier, a deletion of the namespace identifier, an addition of the namespace identifier, or a modification to a table or database associated with storing namespace identifiers.

In a fifth aspect, alone or in combination with one or more of the first through fourth aspects, initiating the second counter comprises setting the second value to the first value of the first counter at the first time.

In a sixth aspect, alone or in combination with one or more of the first through fifth aspects, the method 700 includes detecting another event associated with another command obtained from the host device, the event occurring at a second time, switching, based on detecting the other event, the active identifier for commands obtained after the first time from the second identifier to a third identifier, and initiating a third counter associated with tracking active commands from the host device that were obtained prior to the second time, the third counter being associated with commands that are associated with the third identifier.

In a seventh aspect, alone or in combination with one or more of the first through sixth aspects, the third identifier is the first identifier.

In an eighth aspect, alone or in combination with one or more of the first through seventh aspects, the memory device is associated with multiple physical functions, and the first counter and the second counter are associated with a physical function from the multiple physical functions.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
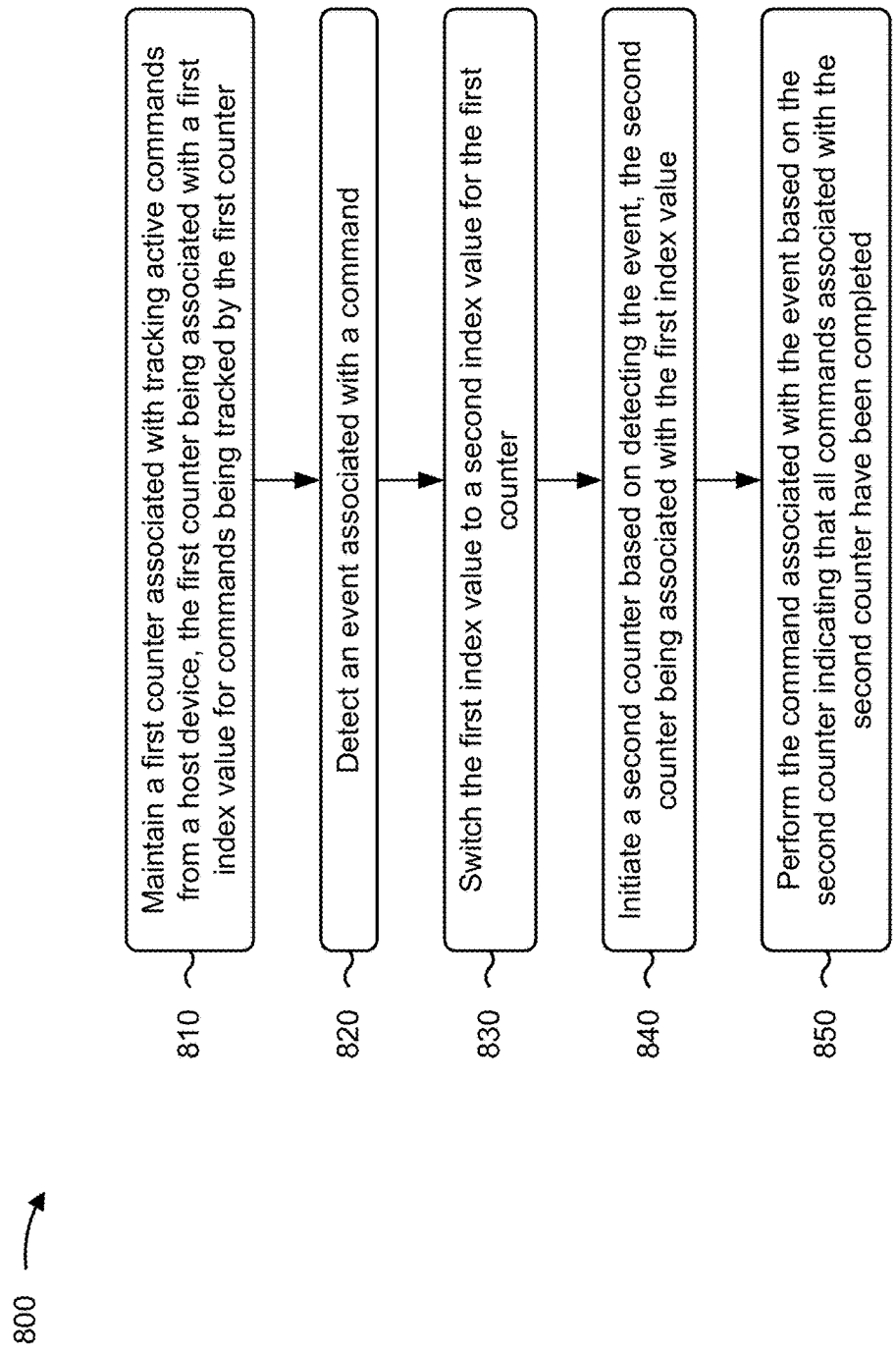
FIG. 8 is a flowchart of an example method associated with memory device active command tracking.

FIG. 8 is a flowchart of an example method 800 associated with memory device active command tracking. In some implementations, a memory device (e.g., the memory device 120) may perform or may be configured to perform the method 800. In some implementations, another device or a group of devices separate from or including the memory device (e.g., the system 100) may perform or may be configured to perform the method 800. Additionally, or alternatively, one or more components of the memory device (e.g., the controller 130, the memory management component 225, the command tracking component 230, and/or the PF management component 235) may perform or may be configured to perform the method 800. Thus, means for performing the method 800 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 800.

As shown in FIG. 8, the method 800 may include maintaining a first counter associated with tracking active commands from a host device, the first counter being associated with a first index value for commands being tracked by the first counter (block 810). As further shown in FIG. 8, the method 800 may include detecting an event associated with a command (block 820). As further shown in FIG. 8, the method 800 may include switching the first index value to a second index value for the first counter (block 830). As further shown in FIG. 8, the method 800 may include initiating a second counter based on detecting the event, the second counter being associated with the first index value (block 840). As further shown in FIG. 8, the method 800 may include performing the command associated with the event based on the second counter indicating that all commands associated with the second counter have been completed (block 850).

The method 800 may include additional aspects, such as any single aspect or any combination of aspects described below and/or described in connection with one or more other methods or operations described elsewhere herein.

In a first aspect, the second counter is associated with active commands at a time at which the event is detected.

In a second aspect, alone or in combination with the first aspect, the method 800 includes updating a first version of a database associated with multiple physical functions based on the command, and switching an active version of the database from a second version to the first version based on the second counter indicating that all commands associated with the second counter have been completed.

In a third aspect, alone or in combination with one or more of the first and second aspects, the database is a namespace database.

In a fourth aspect, alone or in combination with one or more of the first through third aspects, initiating the second counter comprises identifying a first counter value associated with the first counter based on detecting the event, and setting a second counter value, associated with the second counter, to the first counter value.

In a fifth aspect, alone or in combination with one or more of the first through fourth aspects, the event is detected at a first time, and the method 800 includes associating commands, obtained before the first time, with the first index value, and associating commands, obtained after the first time, with the second index value.

In a sixth aspect, alone or in combination with one or more of the first through fifth aspects, the method 800 includes performing another command that is associated with the second index value, and decrementing a counter value associated with the second counter based on the command being associated with the second index value.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a memory device includes one or more components configured to: obtain, from a host device, a first one or more commands; store information associated with the first one or more commands using a first identifier and a first counter that is associated with tracking active commands from the host device; detect an event associated with at least one of the host device, the memory device, or a command; initiate, based on detecting the event, a second counter associated with the first identifier and one or more active commands associated with the first identifier as indicated by the first counter at a time prior to detecting the event; obtain, from the host device, a second one or more commands after detecting the event; and store information associated with the second one or more commands using a second identifier and the first counter.

In some implementations, a method includes obtaining, by a memory device and from a host device, a first one or more commands, the first one or more commands being associated with a first identifier; maintaining, by the memory device, a first counter associated with tracking active commands from the host device; detecting, by the memory device, an event associated with a command obtained from the host device, the event occurring at a first time; switching, by the memory device and based on detecting the event, an active identifier for commands obtained after the first time from the first identifier to a second identifier; initiating, by the memory device, a second counter associated with tracking active commands from the host device that were obtained prior to the first time, the second counter being associated with commands that are associated with the first identifier; performing, by the memory device, an action associated with completing at least one command that is associated with the first identifier; and updating, by the memory device and based on performing the action, a first value associated with the first counter and a second value associated with the second counter based on the at least one command being associated with the first identifier.

In some implementations, an apparatus includes means for maintaining a first counter associated with tracking active commands from a host device, the first counter being associated with a first index value for commands being tracked by the first counter; means for detecting an event associated with a command; means for switching the first index value to a second index value for the first counter; means for initiating a second counter based on detecting the event, the second counter being associated with the first index value; and means for performing the command associated with the event based on the second counter indicating that all commands associated with the second counter have been completed.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:
1. A memory device, comprising:
one or more components configured to:
obtain, from a host device, a first one or more commands;

store information associated with the first one or more commands using a first identifier and a first counter that is associated with tracking active commands from the host device;
detect an event associated with at least one of the host device, the memory device, or a command;
initiate, based on detecting the event, a second counter associated with the first identifier and one or more active commands associated with the first identifier as indicated by the first counter at a time prior to detecting the event, wherein the one or more components, to initiate the second counter, are configured to:
store, for the second counter, a counter value and an indication of commands, from the first one or more commands, that are stored in association with the first counter at the time prior to detecting the event; and
maintain the second counter based on tracking completed commands that are associated with the first identifier;
obtain, from the host device, a second one or more commands after detecting the event; and
store information associated with the second one or more commands using a second identifier and the first counter.

2. The memory device of claim 1, wherein the one or more components are further configured to:
switch, in response to detecting the event, an active command identifier, for commands obtained from the host device, from the first identifier to the second identifier.

3. The memory device of claim 1, wherein the one or more components are further configured to:
perform an action associated with at least one command included in the first one or more commands or the second one or more commands;
decrement the first counter based on performing the action; and
decrement the second counter if the at least one command is associated with the first identifier.

4. The memory device of claim 1, wherein the event is associated with the command, and wherein the one or more components are further configured to:
perform an action associated with the command based on the second counter indicating that there are no active commands associated with the first identifier.

5. The memory device of claim 4, wherein the event is associated with a namespace, and wherein the one or more components are further configured to:
refrain from performing commands, included in the second one or more commands, associated with the namespace after performing the action associated with the command.

6. The memory device of claim 1, wherein the memory device is associated with multiple physical functions, and wherein the event is associated with a table that is accessed by the multiple physical functions.

7. The memory device of claim 6, wherein the one or more components, to initiate the second counter, are configured to:
initiate, for each physical function of the multiple physical functions, the second counter.

8. The memory device of claim 6, wherein the table includes a first table and a second table, and wherein the one or more components are further configured to:
switch an active table for the multiple physical functions from the first table to the second table based on the second counter indicating that there are no active commands associated with the first identifier.

9. A method, comprising:
obtaining, by a memory device and from a host device, a first one or more commands, the first one or more commands being associated with a first identifier;
maintaining, by the memory device, a first counter associated with tracking active commands from the host device;
detecting, by the memory device, an event associated with a command obtained from the host device, the event occurring at a first time;
switching, by the memory device and based on detecting the event, an active identifier for commands obtained after the first time from the first identifier to a second identifier;
initiating, by the memory device, a second counter associated with tracking active commands from the host device that were obtained prior to the first time, the second counter being associated with commands that are associated with the first identifier;
performing, by the memory device, an action associated with completing at least one command that is associated with the first identifier;
updating, by the memory device and based on performing the action, a first value associated with the first counter and a second value associated with the second counter based on the at least one command being associated with the first identifier;
obtaining, from the host device, a second one or more commands, the second one or more commands being associated with the second identifier;
incrementing the first value based on the second one or more commands being associated with the second identifier; and
refraining from incrementing the second value based on the second one or more commands being associated with the second identifier.

10. The method of claim 9, further comprising:
performing another action associated with completing another command that is associated with the second identifier;
decrementing the first value based on the other command being associated with the second identifier; and
refraining from decrementing the second value based on the other command being associated with the second identifier.

11. The method of claim 9, wherein the active identifier for commands is a sequence identifier.

12. The method of claim 9, wherein detecting the event comprises:
detecting at least one of:
a reset associated with a physical function of the memory device,
a modification of a namespace identifier,
a deletion of the namespace identifier,
an addition of the namespace identifier, or
a modification to a table or database associated with storing namespace identifiers.

13. The method of claim 9, wherein initiating the second counter comprises:
setting the second value to the first value of the first counter at the first time.

14. The method of claim 9, further comprising:
detecting another event associated with another command obtained from the host device, the event occurring at a second time;

switching, based on detecting the other event, the active identifier for commands obtained after the first time from the second identifier to a third identifier; and initiating a third counter associated with tracking active commands from the host device that were obtained prior to the second time, the third counter being associated with commands that are associated with the third identifier.

15. The method of claim 14, wherein the third identifier is the first identifier.

16. The method of claim 9, wherein the memory device is associated with multiple physical functions, and wherein the first counter and the second counter are associated with a physical function from the multiple physical functions.

17. An apparatus, comprising:
means for maintaining a first counter associated with tracking active commands from a host device, the first counter being associated with a first index value for commands being tracked by the first counter;
means for detecting an event associated with a command;
means for switching the first index value to a second index value for the first counter;
means for initiating a second counter based on detecting the event, the second counter being associated with the first index value;
means for performing the command associated with the event based on the second counter indicating that all commands associated with the second counter have been completed;
means for updating a first version of a database associated with multiple physical functions based on the command, wherein the database is a namespace database; and
means for switching an active version of the database from a second version to the first version based on the second counter indicating that all commands associated with the second counter have been completed.

18. The apparatus of claim 17, wherein the second counter is associated with active commands at a time at which the event is detected.

19. The apparatus of claim 17, wherein the means for initiating the second counter comprise:
means for identifying a first counter value associated with the first counter based on detecting the event; and
means for setting a second counter value, associated with the second counter, to the first counter value.

20. The apparatus of claim 17, wherein the event is detected at a first time, the apparatus further comprising:
means for associating commands, obtained before the first time, with the first index value; and
means for associating commands, obtained after the first time, with the second index value.

21. The apparatus of claim 17, further comprising:
means for performing another command that is associated with the second index value; and
means for decrementing a counter value associated with the second counter based on the command being associated with the second index value.

22. The memory device of claim 2, wherein the active command identifier is a sequence identifier.

23. The method of claim 9, wherein the memory device is associated with multiple physical functions, and wherein the event is associated with a table that is accessed by the multiple physical functions.

24. The method of claim 23, wherein initiating the second counter comprises:
initiating, for each physical function of the multiple physical functions, the second counter.

25. The method of claim 23, wherein the table includes a first table and a second table, the method further comprising:
switch an active table for the multiple physical functions from the first table to the second table based on the second counter indicating that there are no active commands associated with the first identifier.

* * * * *